United States Patent [19]

Albert et al.

[11] Patent Number: 5,047,312
[45] Date of Patent: Sep. 10, 1991

[54] SILICON NAPHTHALOCYANINES WITH UNSATURATED LIGANDS AND OPTICAL RECORDING MEDIUM

[75] Inventors: Bernhard Albert, Maxdorf; Peter Neumann; Sibylle Brosius, both of Mannheim, all of Fed. Rep. of Germany

[73] Assignee: BASF Aktiengesellschaft, Ludwigshafen, Fed. Rep. of Germany

[21] Appl. No.: 396,678

[22] Filed: Aug. 22, 1989

[30] Foreign Application Priority Data

Sep. 3, 1988 [DE] Fed. Rep. of Germany ....... 3830041

[51] Int. Cl.$^5$ .................... G11B 7/24; C07D 487/22
[52] U.S. Cl. .................................... 430/270; 430/495; 430/945; 540/128
[58] Field of Search ................. 430/270, 495, 945; 540/128

[56] References Cited

FOREIGN PATENT DOCUMENTS

| | | |
|---|---|---|
| 90282 | 10/1983 | European Pat. Off. |
| 171045 | 2/1986 | European Pat. Off. |
| 0191215 | 8/1986 | European Pat. Off. |
| 191970 | 8/1986 | European Pat. Off. |
| 0203826 | 12/1986 | European Pat. Off. |
| 0213923 | 3/1987 | European Pat. Off. |
| 0254553 | 1/1988 | European Pat. Off. |
| 95269 | 4/1988 | Japan . |

OTHER PUBLICATIONS

J. Am. Chem. Soc., vol. 106; 1984, pp. 7404–7410; B. L. Wheeler et al., "A Silicon Phthalocyanine and a Silicon Naphthalocyanine: Synthesis, Electrochemistry, and Electrogenerated Chemiluminescence".

J. Org. Chem. USSR (English translation), vol. 7; pp. 364–366, 1971, E. I. Kovshev et al., "Phthalocyanines and Related Compounds".

*Primary Examiner*—Charles L. Bowers, Jr.
*Assistant Examiner*—Mark R. Buscher
*Attorney, Agent, or Firm*—Oblon, Spivak, McClelland, Maier & Neustadt

[57] ABSTRACT

An optical recording medium contains silicon naphthalocyanines of the formula

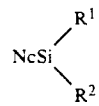

where
Nc is the radical of a naphthalocyanine system which may be substituted by alkyl, alkoxy, aryl or aralkyl, and
$R^1$ and $R^2$ are each independently of the other a radical of the formula $(O)_n R^3$, where n is 0 or 1 and $R^3$ is an unsubstituted radical, or

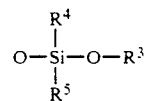

where $R^3$ is as defined above and $R^4$ and $R^5$ are each independently of the other alkyl, alkoxy or $(O)_n R^3$ or $R^1$ is alkyl.

8 Claims, No Drawings

SILICON NAPHTHALOCYANINES WITH UNSATURATED LIGANDS AND OPTICAL RECORDING MEDIUM

The present invention relates to novel silicon naphthalocyanines of the formula I

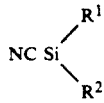
(I)

where

Nc is the radical of a naphthalocyanine system which may be substituted by $C_1$-$C_{12}$-alkyl, $C_1$-$C_{12}$-alkoxy, unsubstituted or $C_1$-$C_4$-alkyl-substituted $C_6$-$C_{12}$-aryl, or by phenyl-$C_1$-$C_6$-alkyl where the phenyl nucleus may be substituted, and $R^1$ and $R^2$ are identical or different and each is independently of the other a radical of the formula $(O)_nR^3$, where n is 0 or 1 and $R^3$ is a radical which has from 2 to 20 carbon atoms and contains from 1 to 5 double bonds and/or from 1 to 3 triple bonds and which may further contain from 1 to 4 phenyl nuclei or from 1 to 3 saturated or unsaturated isocyclic 5-, 6- or 7-membered rings or which may be interrupted by from 1 to 5 oxygen atoms, or a radical of the formula

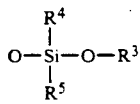

where $R^3$ is as defined above and $R^4$ and $R^5$ are identical or different and each is independently of the other $C_1$-$C_{20}$-alkyl, $C_1$-$C_{20}$-alkoxy or the radical $(O)_nR^3$, where n and $R^3$ are each as defined above, or $R^1$ is $C_1$-$C_{20}$-alkyl, and to an optical recording medium comprising a base and a radiation-sensitive layer which contains the novel compounds.

Recording materials which on irradiation with rays of high energy density, for example laser light, undergo a local change of state are known. This thermally initiated change of state, for example vaporization, change of flow characteristics or fading, entail a change in the optical properties, for example the reflection or absorption, through a change in the absorption maximum or the extinction, which can be utilized for information or data recording.

Suitable light sources for an optical recording medium are for example semiconductor lasers which emit light in the near infrared. Of these it is the solid state injection lasers, especially the AlGaAs laser, which operates within the wavelength range from about 650 to 900 nm, which are particularly notable. There is therefore particular interest in those recording materials which absorb radiation within the wavelength range from about 650 to 900 nm and are processible into thin, homogeneous layers.

J. Amer. Chem. Soc. 106 (1984), 7404-10, EP-A-191,215 and EP-A-191,970 disclose silicon naphthalocyanines whose ligands on the central silicon atom each additionally contain a silicon atom. It has been found, however, that the compounds described therein still have defects if used in optical storage systems.

It is an object of the present invention to provide novel radiation-sensitive products which are strongly reflective and absorptive within the wavelength range of the semiconductor laser used.

We have found that this object is achieved by the above-identified silicon naphthalocyanines of the formula I.

The novel silicon naphthalocyanines are advantageously suitable for use as radiation-sensitive components in optical recording media.

All the saturated and unsaturated radicals appearing in the compounds according to the invention can be not only straight-chain but also branched.

If substituted phenyl radicals appear in the compounds according to the invention, suitable substituents are, unless otherwise stated, for example $C_1$-$C_4$-alkyl, $C_1$-$C_4$-alkoxy or halogen, in particular fluorine, chlorine or bromine.

Suitable radicals $R^4$ and $R^5$ and suitable substituents for the naphthalocyanine system are each for example methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl, 4-ethyloctyl, undecyl, dodecyl, methoxy, ethoxy, propoxy, isopropoxy, butoxy, isobutoxy, pentyloxy, hexyloxy, heptyloxy, octyloxy, 2-ethylhexyloxy, isooctyloxy, nonyloxy, isononyloxy, decyloxy, isodecyloxy, 4-ethyloctyloxy, undecyloxy, or dodecyloxy.

$R^4$ and $R^5$ are each further for example tridecyloxy, 3,5,5,7-tetramethylnonyloxy, isotridecyloxy, tetradecyloxy, pentadecyloxy, hexadecyl, heptadecyloxy, octadecyloxy, nonadecyloxy or eicosyloxy. (The above designations isooctyl, isononyl, isodecyl and isotridecyl are trivial names derived from the alcohols obtained by the oxo process—cf. Ullmann's Enzyklopädie der technischen Chemie, 4th edition, volume 7, pages 215-217, and volume 11, pages 435 and 436.)

Suitable substituents for the naphthalocyanine system are each further for example benzyl, 1- or 2-phenylethyl, methylbenzyl, methoxybenzyl or chlorobenzyl.

$C_6$-$C_{12}$-aryl which may be substituted by $C_1$-$C_4$-alkyl is preferably phenyl or biphenyl which may be substituted by $C_1$-$C_4$-alkyl. Examples are phenyl, 4-methylphenyl, biphenyl and 4'-methylbiphenyl.

$R^3$ is for example vinyl, allyl, prop-1-en-1-yl, methallyl, ethallyl, pentenyl, pentadienyl, hexadienyl, 3,7-dimethylocta-1,6-dien-1-yl, 3,7-dimethylocta-1,6-dien-2-yl, undec-10-1-yl, 6,10-dimethylundeca-5,9-dien-2-yl, 3,7,11-trimethyldodeca-1,6,10-trien-1-yl, 3,7,11-trimethyldodeca-2,6,10-trien-1-yl, octadec-9-en-1-yl, octadeca-9,12-dien-1-yl, octadeca-9,12,15-trien-1-yl, 6,10,14-trimethylpentadeca-5,9,13-trien-2-yl, 3,7,11,15-tetramethylhexadec-1-en-3-yl, pent-3-yn-1-yl, hex-3-yn-1-yl, non-3-yn-1-yl, 3,7-dimethyloct-6-en-1-yn-3-yl, 4-(2,6,6-trimethylcyclohex-1-en-1-yl)but-3-en-2-yl and 1-ethynylcyclohex-1-yl.

Preference is given to those silicon naphthalocyanines of the formula I where Nc is the radical of an unsubstituted naphthalocyanine system.

Preference is further given to silicon naphthalocyanines of the formula I where Nc is the radical of a naphthalocyanine system which is substituted by $C_1$-$C_{12}$-alkyl or by $C_1$-$C_{12}$-alkoxy.

Preference is further given silicon naphthalocyanines of the formula I where $R^1$ and $R^2$ are each independently of the other a radical of the formula $(O)_nR^3$ where n is 0 and $R^3$ is a radical which contains from 2 to 20 carbon atoms and from 1 to 3 double bonds and/or a triple bond.

Preference is further given to silicon naphthalocyanines of the formula I where $R^4$ and $R^5$ are each independently of the other $C_1$-$C_{20}$-alkyl or $C_1$-$C_8$-alkoxy.

Particular preference is given to silicon naphthalocyanines of the formula I where $R^4$ and $R^5$ are each independently of the other $C_1$-$C_{12}$-alkyl, in particular $C_6$-$C_{12}$alkyl.

Particular preference is further given to silicon naphthalocyanines of the formula I where $R^1$ and $R^2$ are each independently of the other a radical of the formula $(O)_nR^3$ where n is 0 and $R^3$ is a radical which contains from 3 to 20 carbon atoms and from 1 to 3 double bonds.

Of particular interest are those silicon naphthalocyanines of the formula I where $R^3$ is vinyl, allyl, prop-1-en-yl, methallyl, ethallyl, pentenyl, pentadienyl, hexadienyl, 3,7-dimethylocta-1,6-dien-1-yl, 3,7-dimethylocta-1,6-dien-2-yl, undec-10-en-1-yl, 6,10-dimethylundeca-5,9-dien-2-yl, 3,7,11-trimethyldodeca-1,6,10-trien-1-yl, 3,7,11-trimethyldodeca-2,6,10-trien-1-yl, octadeca-9-en-1-yl, octadeca-9,12-dien-1-yl and octadeca-9,12,15-trien-1-yl.

The silicon naphthalocyanines according to the invention can be obtained in a conventional manner as described for example in J. Org. Chem. USSR (English translation) 7 (1971) 364-366, J. Amer. Chem. Soc. 106 (1984) 7404-10, or EP-A-191,970.

The starting materials used are for example a corresponding diiminoisoindolenine of the formula II

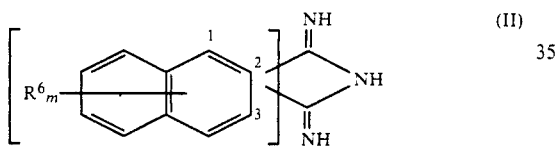

where $R^6$ is hydrogen, $C_1$-$C_{12}$-alkyl, $C_1$-$C_{12}$-alkoxy, unsubstituted or $C_1$-$C_4$-alkyl-substituted $C_6$-$C_{12}$-aryl, or phenyl-$C_1$-$C_6$-alkyl where the phenyl nucleus may be substituted, m is 1 or 2, and the substituents capable of naphthalocyanine formation are in each case ortho to each other (positions 1 and 2 or 2 and 3).

These isoindolenines of formula II are in general reacted with chlorosilanes of the formula III

where $X^1$ is $C_1$-$C_{20}$-alkyl, the above radical $R^3$ or chlorine and $X^2$ is the above mentioned radical $R^3$ or chlorine, in an inert organic diluent in the presence of a base at 170° to 250° C. with silicon naphthalocyanines of the formula IV

where Nc, $X^1$ and $X^2$ are each as defined above.

Suitable diluents are for example tetralin and nitrobenzene.

Suitable bases are for example tertiary amines, such as tributylamine, quinoline, picolines or collidines.

By reacting those silicon naphthalocyanines of the formula IV where at least one of $X^1$ and $X^2$ is chlorine with alcohols of the formula V $$R^3\text{—OH} \qquad\qquad (V)$$

where $R^3$ is as defined above, at from 30° to 120° C. it is possible to arrive at those silicon naphthalocyanines of the formula I where one of $R^1$ and $R^2$ or both $R^1$ and $R^2$ are each $OR^3$ where $R^3$ is as defined above.

Those silicon naphthalocyanines of the formula IV where at least one of $X^1$ and $X^2$ is chlorine can also be converted with concentrated sulfuric acid or with aqueous bases, for example sodium oxide solution, potassium oxide solution or aqueous ammonia solution, in the presence or absence of pyridine, at from 5° to 80° C. into the corresponding hydroxy compounds of the formula VI

where Y is hydroxyl, $C_1$-$C_{20}$-alkyl or the above mentioned radical $R^3$ and Nc has the above mentioned meaning.

By reacting the hydroxy compound VI first with a chlorosilane of the formula VI

where $Z^1$ and $Z^2$ are identical or different and each is independently of the other $C_1$-$C_{20}$-alkyl, the above mentioned radical $R^3$ or chlorine, in pyridine in the presence of sodium hydride at from 15° to 150° C. and then with an alcohol of the above mentioned formula V and optionally with a $C_1$-$C_{20}$-alkanol at from 30° to 120° C. it is finally possible to arrive at the silicon naphthalocyanines of the formula I according to the invention which possess the group

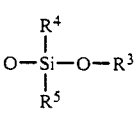

where $R^3$, $R^4$ and $R^5$ are each as defined above.

It is a further object of the present invention to provide a novel optical recording medium in which the layers which contain the novel products should be homogeneous, should show good adhesion to customary base materials and should be stable over a prolonged period.

We have found that this object is achieved by an optical recording medium comprising a base and a radiation-sensitive layer, wherein the radiation-sensitive layer contains a silicon naphthalocyanine of the formula I

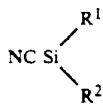

where

Nc is the radical of a naphthalocyanine system which may be substituted by $C_1$–$C_{12}$-alkyl, $C_1$–$C_{12}$-alkoxy, unsubstituted or $C_1$–$C_4$-alkyl-substituted $C_6$–$C_{12}$-aryl, or by phenyl-$C_1$–$C_6$-alkyl where the phenyl nucleus may be substituted, and $R^1$ and $R^2$ are identical or different and each is independently of the other a radical of the formula $(O)_nR^3$, where n is 0 or 1 and $R^3$ is a radical which has from 2 to 20 carbon atoms and contains from 1 to 5 double bonds and/or from 1 to 3 triple bonds and which may further contain from 1 to 4 phenyl nuclei or from 1 to 3 saturated or unsaturated isocyclic 5-, 6- or 7-membered rings or which may be interrupted by from 1 to 5 oxygen atoms, or a radical of the formula

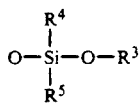

where $R^3$ is as defined above and $R^4$ and $R^5$ are identical or different and each is independently of the other $C_1$–$C_{20}$-alkyl, $C_1$–$C_{20}$alkoxy or the radical $(O)_nR^3$, where n and $R^3$ are each as defined above, or $R^1$ is $C_1$–$C_{20}$-alkyl.

The novel silicon naphthalocyanines of the formula I show high molar adsorption in the near infrared. They form homogeneous, amorphous layers and/or are advantageously incorporable into dye-in-polymer layers.

Preference is given to an optical recording medium which contains a silicon naphthalocyanine of the formula I where Nc is the radical of an unsubstituted naphthalocyanine system.

Preference is further given to an optical recording medium which contains a silicon naphthalocyanine of the formula I where Nc is the radical of a naphthalocyanine system which is substituted by $C_1$–$C_{12}$-alkyl or $C_1$–$C_{12}$-alkoxy.

Preference is further given to an optical recording medium which contains a silicon naphthalocyanine of the formula I where $R^1$ and $R^2$ are each independently of the other a radical of the formula $(O)_nR^3$ where n is 0 and $R^3$ is a radical which contains from 2 to 20 carbon atoms and from 1 to 3 double bonds and/or a triple bond.

Preference is further given to an optical recording medium which contains a silicon naphthalocyanine of the formula I where $R^4$ and $R^5$ are each independently of the other $C_1$–$C_{20}$-alkyl, or $C_1$–$C_8$-alkoxy.

Particular preference is given to an optical recording medium which contains a silicon naphthalocyanine of the formula I where $R^4$ and $R^5$ are each independently of the other $C_1$–$C_{12}$-alkyl, in particular $C_6$–$C_{12}$-alkyl.

Particular preference is further given to an optical recording medium which contains a silicon naphthalocyanine of the formula I where $R^1$ and $R^2$ are each independently of the other a radical of the formula $(O)_nR^3$ where n is and $R^3$ is a radical which contains from 3 to 20 carbon atoms and from 1 to 3 double bonds.

Of particular interest is an optical recording medium which contains a silicon naphthalocyanine of the formula I where $R^3$ is vinyl, allyl, prop-1-en-1-yl, methallyl, ethallyl, pentenyl, pentadienyl, hexdienyl, 3,7-dimethylocta-1,6-dien-1-yl, 3,7-dimethyl-octa-1,6-dien-2-yl, undec-10-en-1-yl, 6,10-dimethylundeca-5,9-dien-2-yl, 3,7,11-trimethyldodeca-1,6,10-trien-1-yl, 3,7,11-trimethyldodeca-2, 6,10-trien-1-yl, octadec-9-en-1-yl, octadeca-9,12-dien-1-yl or octadeca-9,12,15-trien-1-yl.

Further components of the radiation-sensitive layer can be for example polymers which are compatible with the compounds of the formula I. Polymers of this type are in general referred to as binders.

Examples of suitable binders are polystyrenes, polyesters, polyacrylates, polymethacrylates, polycarbonates, polyamines, polyvinyl alcohols, polyvinyl chlorides, copolymers of vinyl chloride and vinyl acetate, and polymers of copolymers which contain mesogenic side groups as described in EP-A-90,282 and EP-A-171,045.

In addition, the films may contain further suitable additives, such as low molecular weight liquid crystalline compounds.

Preference is given to an optical recording medium whose radiation-sensitive layer consists only of silicon naphthalocyamines of the formula I and of which the dyes are present in the amorphous state.

This term "amorphous" indicates that the radiation-sensitive layer does not have any anisotropic domains larger than a fraction of the thermally changed dimensions, but that the layer is optically isotropic at about 30 nm or higher.

In general, the thickness of the radiation sensitive layer is from 20 to 400 nm, preferably from 40 to 300 nm.

Preferably, the dyes included in the optical recording medium according to the invention absorb laser light, in particular laser light of the relatively long wavelength (650 to 900 nm).

Preference is given to a recording medium of this type which is based on a disklike base, with or without a reflector layer, and which permits the writing and reproduction of information by means of a semiconductor laser. Particular preference here is given to a recording medium which does not contain a reflector layer.

An optical storage system so constructed can record high-density information in the form of spiroidal or circularly concentric tracks, fine holes or depressions (about 1 μm in width) which are optically detectable by a change in the reflectivity compared with the surroundings, and it gives good contrast.

Owing to the high light absorption of the dyes, the recording medium according to the invention is very sensitive to the light of the semiconductor laser.

The construction of recording media is known per se.

Suitable bases are for example glass plates or disks or plastics plates or disks, in particular plates or disks made of polymethyl methacrylate, polystyrene, polystyrene copolymers, polyvinyl chloride, polymethylpentene or polycarbonate, with or without tracking grooves.

This base may have the shape of a tape, of a square or rectangular plate or of a round disk, of which the disks 10 or 13 cm in diameter known and customary for laser-optical recording materials are preferred.

In addition, the recording materials may include further layers, such as protective layers, adhesive layers or electrode layers.

Besides the base there may also be present a reflective layer, so that the incident light which passes through the colored layer and is not absorbed is reflected at the reflector layer and passes once more through the colored layer.

Irradiation preferably takes place through a transparent substrate. A possible sequence of layers is then: substrate-absorber layer-optional reflector).

The base or the light-reflecting layer must have an optically smooth, planar surface which must be so constituted that the absorptive layer firmly adheres thereto. For a positive effect on the surface quality and adhesion phenomena, the base and/or the reflector may be provided with a planarizing layer made of thermosetting thermoplastic material.

If the radiation-sensitive layer does not have adequate mechanical stability, it may be coated with a transparent protective layer. A number of polymers can be used for this purpose, which, applied by spin coating, knife coating or dip coating of dissolved polymers or vacuum vapor deposition, chiefly in the case of fluorinated polymers, can form a protective layer.

If the data store is constructed from two identical or different recording media in the form of a sandwich, a protective layer can be dispensed with. Besides greater mechanical and rotation-dynamical stability, the sandwich construction offers the advantage of doubled storage capacity.

However, the protective and/or intermediate layers can also be dispensed with if the optical recording medium is of sufficient quality.

The recording medium according to the invention, containing the novel silicon naphthalocyanines, strongly absorbs at the semiconductor laser wavelength of from about 650 to 900 nm. The silicon naphthalocyanines can be applied in such a way as to produce smooth absorption layers of optical quality into which the information to be stored can be written with a high signal-to-noise ratio.

The absorption materials are preferably applied by spin coating dissolved or dispersed dye with or without binders. Other possible layer formation methods are knife coating and dip coating. Metallic reflection layers for example are preferably applied by vacuum vapor deposition or by mounting suitable metal foils on the base.

To apply the absorption layers from solution or dispersion, a suitable solvent such as hexane, heptane, octane, isooctane, cyclohexane, methylcyclohexane, ethylcyclohexane, methylene chloride, chloroform, carbon tetrachloride, bromoform, 1,1,1-trichloroethane, 1,1,2-trichloroethane, acetone, methyl ethyl ketone, cyclohexanone, toluene, acetonitrile, ethyl acetate, methanol, ethanol, ether alcohols, such as 2-methoxyethanol, 2-ethoxyethanol, 2-isopropoxyethanol, 3-methoxypropanol, 3-ethoxypropanol, or 3-isopropoxypropanol or a mixture thereof is used to prepare a solution or as the case may be a dispersion of silicon naphthalocyanine or mixtures of these compound with or without the binder, and with or without the addition of an assistant.

This dye preparation is then applied by knife or dip coating but preferably by spin coating to a previously cleaned or subbed surface in layer form and is air dried or cured. The film may also be dried or cured under reduced pressure at elevated temperatures with or without radiation.

As mentioned above, preference is given to a recording medium whose radiation-sensitive layer consists only of silicon naphthalocyanines of the formula I, in particular to a recording medium where this layer has been applied by spin coating.

Depending on the construction of the system, first the radiation-sensitive layer is applied and then the reflector, or vice versa. The application of intermediate or protective layers or a reflective layer may, as stated above, also be dispensed with in certain circumstances.

Preference is given to a monolayer system without reflector.

The recording media according to the invention can be written with analog or digital data by means of a write laser beam, analog data being written as is known by means of an analog code modulated continuous wave laser and digital data by means of a pulse code modulated laser.

In general, suitable lasers have at the write wavelength a beam power output of from 1 to 20 mW. The focus diameter of the write laser beam is in general from 300 to 2000 nm. Customarily, the pulse duration on irradiation with a pulse code modulated laser is from 10 to 1000 ns. It is advantageous to use for the writing a laser beam of light of a wavelength which is readily absorbed on the recording layer in question. It is advantageous to use wavelengths of from 400 to 1000 nm.

In the writing operation, the laser beam is guided in a relative motion across the recording material while being perpendicularly incident thereupon and focused on the recording layer. At the point of incidence, the recording layer is locally heated, forming thermally altered area, for example in the shape of holes craters or spots. On writing data with pulse code modulated lasers, these areas have essentially a round or oval shape from 100 to 2000 nm in diameter. If written with an analog code modulated continuous wave laser, they can have any desired shape.

The optical recording medium according to the invention is highly suitable for laser-optical data recording.

The data can be written into the recording layer from the base remote side of the layer or through the optically clear base. The latter is of particular advantage.

The written data are read by means of a read laser beam. The power of the read laser beam at the read wavelength is below the threshold at which writing becomes possible. In general, the beam power is from 0.1 to 1.5 mW. It is advantageous to use the laser light of a wavelength which is strongly reflected by the recording layer. The advantageous wavelength ranges from 400 to 1000 nm, in particular from 630 to 900 nm.

In reading, too, the read laser beam is guided in a relative motion across the recording material while being perpendicularly incident thereupon and focused on the recording layer.

If in the course of scanning across the recording layer the read laser beam encounters a thermally altered area, for example a spot, the properties of the light transmitted or reflected by the recording material undergo a change, which is detectable by means of suitable detectors.

This reading of the data in the recording layer can take place from the base remote side of the layer or through the optically clear, transparent base, the latter being of advantage. It is particularly advantageous here to detect the reflected light.

It is also of particular advantage to use for this purpose write and read lasers which emit within the infrared wavelength range from 650 to 900 nm. It is also of advantage here if the write wavelength is identical to the read wavelength or differs only little therefrom. Light of these wavelengths is supplied by customary and known semiconductor lasers.

The recording media according to the invention have numerous special advantages. For instance, their unwritten recording layer is particularly stable, so that it is still highly suitable for a laser-optical data recording even after prolonged storage at comparatively high temperatures and atmospheric humidities. The same is true of the written recording layer; it suffers no information loss even on very prolonged storage. For this reason it is also possible to use write lasers of comparatively low beam power. Moreover, the written recording materials show a particularly high optical contrast between the written and the unwritten areas, which exceeds the previously known optical contrast of written phthalocyanine layers. Furthermore, the novel recording materials permit a bit density of significantly above $10^7$ bits/cm$^2$ and, what is more, the data can be read immediately after having been written.

The silicon naphthalocyanines of the formula I according to the invention have further very good application advantages and therefore can also be used for other purposes. More particularly, they can be used for fabricating IR protective layers, IR absorptive films, eyeshade coatings, coatings for automotive windscreens, IR inks, printing inks for IR readable bar codes, liquid crystal displays or IR security systems.

IR readable bar codes are for example bar codes applied to packaging to identify the goods inside.

Liquid crystal displays are the known arrangements which contain layers of liquid-crystalline substances. These layers undergo local changes in optical properties on application of an electrical voltage, which makes it possible to display for example numbers, letters or images.

IR safety systems are arrangements which consist essentially of a laser light source and a suitable detector remote therefrom. The laser beam emitted by the laser light source of this arrangement is incident upon the detector and forms a light barrier. If this barrier is broken, the detector initiates the triggering of an alarm.

Electrophotographic recording materials essentially contain layers which in the dark have a high electrical resistance but on irradiation become conductive. If such layers are electrostatically charged at the surface in the dark and then subjected to imagewise exposure the electrostatic charge in the exposed areas is discharged, the result being an electrostatic image which can be made visible by means of toners.

The Examples which follow serve to illustrate the invention in more detail.

A) Synthesis

EXAMPLE 1

Synthesis of

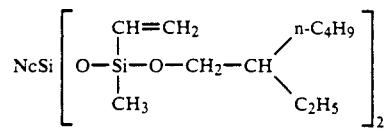

5 g of dihydroxysilicon naphthalocyanine were added to a mixture of 150 ml of pyridine, 50 ml of toluene and 10 ml of tributylamine. 0.5 g of sodium hydride was then added, the mixture was stirred at 80° C. for 3 hours. After cooling down, 10 ml of methyl vinyl dichlorosilane $CH_3(CH_2=CH)SiCl_2$ were added, and the reaction mixture was stirred at room temperature overnight, and about 100 ml were then distilled off.

After 7 ml of 2-ethylhexanol had been added, the mixture was stirred at about 80° C. for 6 hours, all the volatiles were then substantially distilled off under the same conditions, the mixture was cooled down, and about 200 ml of methanol were added.

The target product was filtered off with suction and washed with methanol.

The compounds of the formula

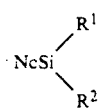

listed below in Tables 1 and 2 were obtained in a similar manner. The Tables also show the chlorosilane used and the alcohol used.

To characterize these compounds, Table 3 indicates their Rf values.

TABLE 1

| Compound | $R^1=R^2$ | Chlorosilane | Alcohol |
|---|---|---|---|
| 2 | O—Si(CH$_3$)—O—(CH$_2$)$_6$C(CH$_3$)$_3$ with CH=CH$_2$ | $CH_3(CH_2=CH)SiCl_2$ | $HO-(CH_2)_6C(CH_3)_3$ |
| 3 | O—Si(CH$_3$)—O—(CH$_2$)$_8$(CH=CH—CH$_2$)$_2$(CH$_2$)$_3$CH$_3$ with CH=CH$_2$ | $CH_3(CH_2=CH)SiCl_2$ | $HO-(CH_2)_8(CH=CH-CH_2)_2(CH_2)_3CH_3$ |
| 4 | O—Si(CH$_3$)—O—(CH$_2$)$_8$(CH=CH—CH$_2$)$_3$CH$_3$ with CH=CH$_2$ | $CH_3(CH_2=CH)SiCl_2$ | $HO-(CH_2)_8(CH=CH-CH_2)_3CH_3$ |
| 5 | O—Si(CH$_3$)—(CH$_2$)$_8$(CH=CH—CH$_2$)$_2$(CH$_2$)$_3$CH$_3$ with CH$_3$ | $(CH_3)_2SiCl_2$ | $HO-(CH_2)_8(CH=CH-CH_2)_2(CH_2)_3CH_3$ |

TABLE 1-continued

| Compound | $R^1 = R^2$ | Chlorosilane | Alcohol |
|---|---|---|---|
| 6 | $\text{O}-\underset{\underset{CH_3}{\vert}}{\overset{\overset{CH_3}{\vert}}{Si}}-\text{O}-(CH_2)_8(CH=CH-CH_2)_3CH_3$ | $(CH_3)_2SiCl_2$ | $HO-(CH_2)_8(CH=CH-CH_2)_3CH_3$ |
| 7 | $\text{O}-\underset{\underset{CH=CH_2}{\vert}}{\overset{\overset{CH_3}{\vert}}{Si}}-\text{O}-(CH_2)_{11}CH_3$ | $CH_3(CH_2=CH)SiCl_2$ | $HO-(CH_2)_{11}CH_3$ |
| 8 | $\text{O}-\underset{\underset{CH=CH_2}{\vert}}{\overset{\overset{CH_3}{\vert}}{Si}}-\text{O}-(CH_2)_{17}CH_3$ | $CH_3(CH_2=CH)SiCl_2$ | $HO-(CH_2)_{17}CH_3$ |

TABLE 2

| Compound | R$^1$ | R$^2$ | Chlorosilane | Alcohol |
|---|---|---|---|---|
| 9 | n-C$_6$H$_{13}$ | O—Si(CH$_3$)(CH=CH$_2$)—O—(CH$_2$)$_3$—CH(C$_2$H$_5$)—(CH$_2$)$_3$—CH$_3$ | CH$_3$(CH$_2$=CH)SiCl$_2$ | HO—(CH$_2$)$_3$—CH(C$_2$H$_5$)—(CH$_2$)$_3$—CH$_3$ |
| 10 | n-C$_6$H$_{13}$ | O—Si(CH$_3$)(CH=CH$_2$)—O—CH$_2$—CH(C$_2$H$_5$)—(CH$_2$)$_3$—CH$_3$ | CH$_3$(CH$_2$=CH)SiCl$_2$ | HO—CH$_2$—CH(C$_2$H$_5$)—(CH$_2$)$_3$—CH$_3$ |
| 11 | n-C$_8$H$_{17}$ | O—Si(CH$_3$)(CH=CH$_2$)—O—CH$_2$—CH(C$_2$H$_5$)—(CH$_2$)$_3$—CH$_3$ | CH$_3$(CH$_2$=CH)SiCl$_2$ | HO—CH$_2$—CH(C$_2$H$_5$)—(CH$_2$)$_3$—CH$_3$ |
| 12 | n-C$_8$H$_{17}$ | O—Si(CH$_3$)(CH=CH$_2$)—O—(CH$_2$)$_3$—CH(C$_2$H$_5$)—(CH$_2$)$_3$—CH$_3$ | CH$_3$(CH$_2$=CH)SiCl$_2$ | HO—(CH$_2$)$_3$—CH(C$_2$H$_5$)—(CH$_2$)$_3$—CH$_3$ |
| 13 | n-C$_6$H$_{13}$ | O—Si(CH$_3$)(CH=CH$_2$)—O—(CH$_2$)$_8$—(CH=CH—CH$_2$)$_3$—(CH$_2$)$_3$—CH$_3$ | CH$_3$(CH$_2$=CH)SiCl$_2$ | HO—(CH$_2$)$_8$—(CH=CH—CH$_2$)$_3$—(CH$_2$)$_3$—CH$_3$ |
| 14 | n-C$_{12}$H$_{25}$ | O—Si(CH$_3$)(CH=CH$_2$)—O—(CH$_2$)$_8$—(CH=CH—CH$_2$)$_3$—(CH$_2$)$_3$—CH$_3$ | CH$_3$(CH$_2$=CH)SiCl$_2$ | HO—(CH$_2$)$_8$—(CH=CH—CH$_2$)$_3$—(CH$_2$)$_3$—CH$_3$ |
| 15 | n-C$_8$H$_{17}$ | O—Si(CH$_3$)(n-C$_6$H$_{13}$)—O—(CH$_2$)$_8$—(CH=CH—CH$_2$)$_3$—(CH$_2$)$_3$—CH$_3$ | CH$_3$(CH$_2$=CH)SiCl$_2$ | HO—(CH$_2$)$_8$—(CH=CH—CH$_2$)$_3$—(CH$_2$)$_3$—CH$_3$ |
| 16 | n-C$_8$H$_{17}$ | O—Si(n-C$_6$H$_{13}$)(CH$_3$)—O—(CH$_2$)$_8$—(CH=CH—CH$_2$)$_3$—(CH$_2$)$_3$—CH$_3$ | CH$_3$(n-C$_6$H$_{13}$)SiCl$_2$ | HO—(CH$_2$)$_8$—(CH=CH—CH$_2$)$_3$—(CH$_2$)$_3$—CH$_3$ |

TABLE 3

| Rf values Example No. | Mobile phase: A | Mobile phase: B |
| --- | --- | --- |
| 1 | 0.65 | |
| 2 | 0.88 | 0.63 |
| 3 | 0.86 | |
| 4 | 0.67 | |
| 5 | 0.61 | |
| 6 | 0.68 | |
| 7 | 0.75 | |
| 8 | 0.61 | |
| 9 | 0.76 | |
| 10 | 0.88 | |
| 11 | 0.80 | |
| 12 | 0.62 | |
| 13 | 0.71 | |
| 14 | 0.38 | |
| 15 | 0.38 | |
| 16 | 0.74 | |

The Rf values listed above were recorded on silica gel plates from Machery und Nagel (Polygram 0.2 mm, N-HR UV 254).

The mobile phase used was
A) Toluene
B) 1:1(v/v) toluene/hexane

Method for producing a coating film 1 g of the compound of Example 1 was stirred in 20 ml of toluene at room temperature overnight and then forced under pressure through a sintered P4 crucible. The resultant solution was then applied by means of a syringe to a rotating disk of polymethyl methacrylate (diameter 12 cm), excess solution being spun off at a speed of 2000 rpm over 25 seconds and the layer then spun dry at a speed of 5000 rpm over 35 seconds. The layer obtained was homogeneous, pinhole free and highly reflective.

B) Use

To write to and read the recording material whose preparation was described above, a customary and known measuring drive was used. The latter comprised a pulse code modulated laser which emitted light of the wavelength 836 nm with maximum writing power output of 10 mW.

To detect the spots, the light reflected by the recording layer through the disks was detected in a conventional manner.

The recording material was written by means of a write laser whose writing power was varied. On reading back, the amplitude of the pulses of the reflected read laser light caused by the spots was measured and recorded as a function of the writing power with which the spots in question had been originally produced. This method was used to determine the minimum writing power required to produce satisfactory signals—the prerequisite for data recording—under the above mentioned conditions. This was found to be 2.5 mW, which testified to the high sensitivity of the recording material according to the invention.

The recording material was stored at 60° C. and a relative humidity of 90% for 10 weeks. During this period, no adverse changes occurred; on the contrary, the recorded data was still readable without error.

We claim:

1. A silicon naphthalocyanine of formula I:

wherein Nc is a radical of a naphthalocyanine system which may be substituted by $C_1$-$C_{12}$-alkyl, $C_1$-$C_{12}$-alkoxy, unsubstituted or $C_1$-$C_4$-alkyl-substituted $C_6$-$C_{12}$-aryl, or by phenyl-$C_1$-$C_6$-alkyl where the phenyl nucleus may be substituted, and $R^1$ and $R^2$ are identical or different and each is independently of the other a radical of the formula:

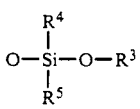

where $R^3$ is a radical which has from 2 to 20 carbon atoms and contains from 1 to 5 double bonds, from 1 to 3 triple bonds, or combinations thereof and which may further contain from 1 to 4 phenyl nuclei or from 1 to 3 saturated or unsaturated isocyclic 5-, 6- or 7-membered rings or which may be interrupted by from 1 to 5 oxygen atoms, $R^4$ and $R^5$ are identical or different and each is independently of the other $C_1$-$C_{20}$-alkyl, $C_1$-$C_{20}$-alkoxy or the radical $(O)_nR^3$, wherein n is 0 or 1 and $R^3$ is as defined above, or $R^1$ is $C_1$-$C_{20}$-alkyl.

2. A silicon naphthalocyanine of the formula I as claimed in claim 1, wherein Nc is the radical of an unsubstituted naphthalocyanine system.

3. An optical recording medium comprising a base and a radiation-sensitive layer, wherein the radiation-sensitive layer contains a silicon naphthalocyanine of formula I:

wherein Nc is a radical of a naphthalocyanine system which may be substituted by $C_1$-$C_{12}$-alkyl, $C_1$-$C_{12}$-alkoxy, unsubstituted or $C_1$-$C_4$-alkyl-substituted $C_6$-$C_{12}$-aryl, or by phenyl-$C_1$-$C_6$-alkyl where the phenyl nucleus may be substituted, and $R^1$ and $R^2$ are identical or different and each is independently of the other a radical of the formula:

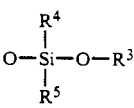

where $R^3$ is a radical which has from 2 to 20 carbon atoms and contains from 1 to 5 double bonds, from 1 to 3 triple bonds, or combinations thereof and which may further contain form 1 to 4 phenyl nuclei or from 1 to 3 saturated or unsaturated isocyclic 5-, 6- or 7-membered rings or which may be interrupted by from 1 to 5 oxygen atoms, $R^4$ and $R^5$ are identical or different and each is independently of the other $C_1$-$C_{20}$-alkyl, $C_1$-$C_{20}$-alkoxy or the radical $(O)_nR^3$, wherein n is 0 or 1 and $R^3$ is as defined above, or $R^1$ i $C_1$-$C_{20}$-alkyl.

4. An optical recording medium as claimed in claim 3, which contains a silicon naphthalocyanine of the formula I where Nc is the radical of an unsubstituted naphthalocyanine system.

5. The silicon naphthalocyanine compound of claim 1, wherein $R^3$ is a member selected from the group consisting of vinyl, allyl, prop-1-enyl, methallyl, ethallyl, pentenyl, pentadienyl, hexadienyl, 3,7-dimethylocta-1,6-dien-1-yl, 3,7-dimethylocta-1,6-dien-2-yl, undec-10-en-1-yl, 6,10-dimethylundeca-5, 9-dien-2-yl, 3,7,11-trimethyldodeca-1,6,10-trien-1-yl, 3,7,11-trimethyldodeca-2,6,10-trien-1-yl, octadeca-9-en-1-yl, octadeca-9,12-dien-1-yl or octadeca-9,12,15-trien-1-yl.

6. The silicon naphthalocyanine compound of claim 1, wherein said $C_1$–$C_{20}$-alkyl group represented by $R^4$ or $R^5$ is selected from the group consisting of: methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isoctyl, nonyl, isononyl, decyl, isodecyl, 4-ethyloctyl, undecyl, and dodecyl.

7. The silicon naphthalocyanine compound of claim 1, wherein said $C_1$–$C_{20}$-alkoxy group represented by $R^4$ or $R^5$ is selected from the group consisting of: methoxy, ethoxy, propoxy, isopropoxy, butoxy, isobutoxy, pentyloxy, hexyloxy, heptyloxy, octyloxy, 2ethylhexyloxy, isooctyloxy, nonloxy, isononyloxy, decyloxy, isodecyloxy, 4-ethyloctyloxy, undecyloxy, and dodecyloxy.

8. The silicon naphthalocyanine compound of claim 1, wherein said $C_6$–$C_{12}$-aryl is phenyl or biphenyl.

* * * * *